Patented Apr. 19, 1932

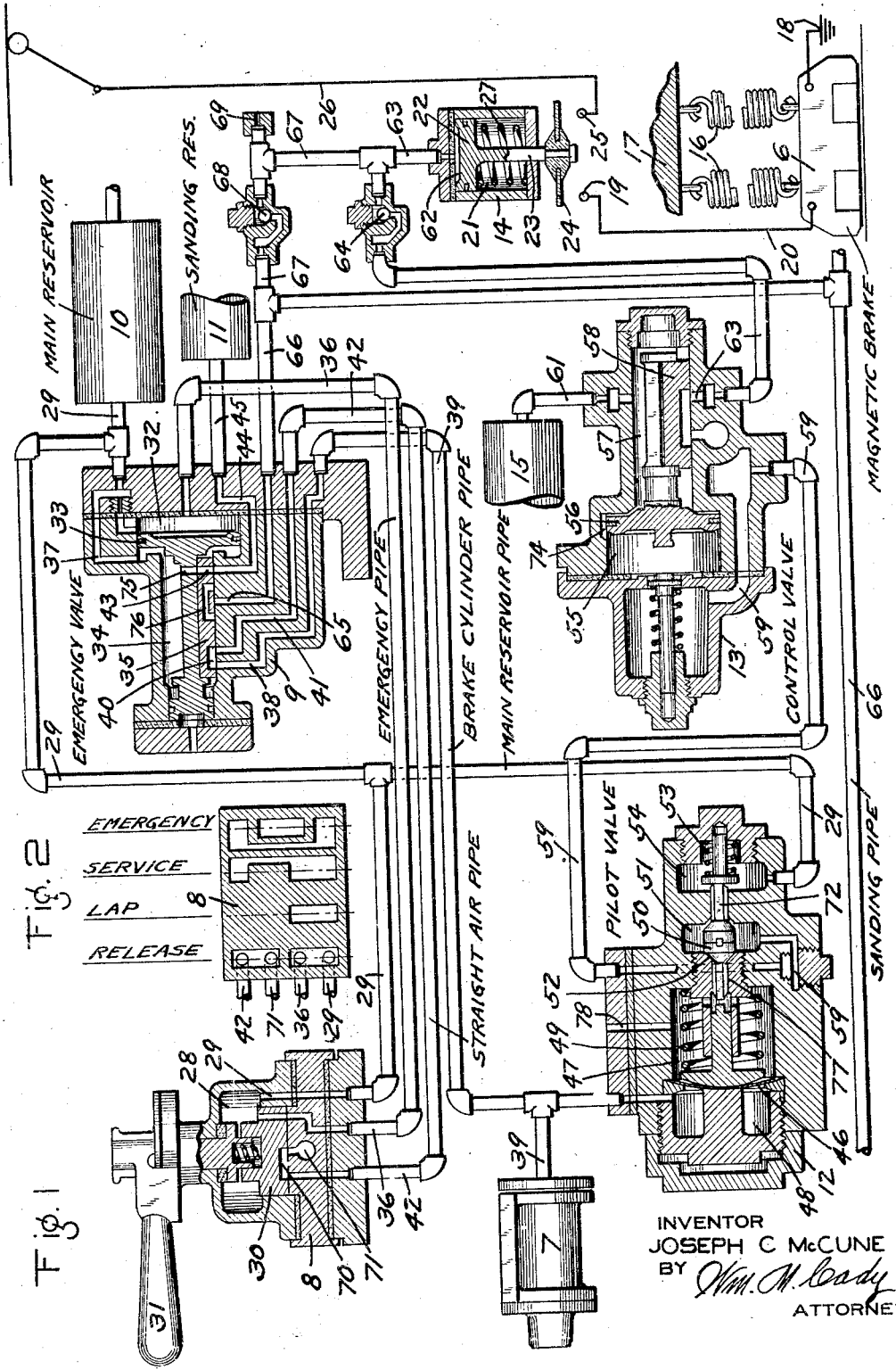

1,854,712

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNETIC BRAKE DEVICE

Application filed March 22, 1930. Serial No. 438,141.

This invention relates to brakes, and more particularly to a combined fluid pressure and magnetic brake device.

An object of the invention is to provide a combined fluid pressure and magnetic brake apparatus in which the magnetic brake is operated when the brake cylinder pressure exceeds a predetermined amount.

Another object of the invention is to provide an improved brake apparatus of the above type, in which the magnetic brake is adapted to remain inactive, when an ordinary service application of the fluid pressure brakes is effected, and in which the magnetic brake is actuated by means operated when an emergency application of the brakes is effected.

Another object of the invention is to provide an improved magnetic brake device of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a diagrammatic view, mostly in section of a combined fluid pressure and magnetic brake apparatus embodying the invention; and Fig. 2 is a development of the brake valve device shown in Fig. 1.

Referring to the drawings, the apparatus may comprise a magnetic brake 6, brake cylinder 7, brake valve device 8, emergency valve device 9, main reservoir or other source of fluid under pressure 10, sanding reservoir 11, pilot valve device 12, control valve device 13, a pneumatically operated switch device 14 for the magnetic brake, and a reservoir 15 associated with the control valve device 13.

The magnetic brake 6 may comprise a shoe which is suspended above the rail by coil springs 16 which are secured at one end to a portion 17 of the car truck.

The magnetic brake shoe 6 may be of any approved construction, and one terminal of the energizing coils thereof (not shown) is connected to a ground 18, while the other terminal of said magnet coils is connected to a contact 19 of the switch device 14, by a wire 20.

The switch device 14 may comprise a cylinder 21, containing a piston 22, having a stem 23, projecting from one side thereof. The stem 23 extends through the casing of the switch device 14, and is provided, near its extremity, with a contact member 24, which is suitably insulated from the stem in the manner shown. The contact member 24 is preferably in the form of a disc, which is adapted to engage with the contact 19 and another contact 25 connected to a source of current supply wire 26, to complete the circuit through which the magnetic brake shoe 6 is energized, when the switch device 14 is operated.

A coil spring 27 in the cylinder 21 urges the piston 22 upwardly, so that the contact member 24 is normally disengaged from the contacts 19 and 25, and the magnetic brake circuit is opened.

The brake valve device 8 may comprise a casing having a chamber 28, connected to the main reservoir 10 by a passage and pipe 29, and contains a rotary valve 30, which is adapted to be operated by a handle 31.

The emergency valve device 9 may comprise a casing having a piston chamber 32, containing a piston 33 and a valve chamber 34, containing a slide valve 35 adapted to be operated by piston 33.

The piston chamber 32 is connected to the usual brake pipe 36, and the valve chamber 34 is connected through passage 37 with the main reservoir pipe 29. The passage 38, leading to the seat of the slide valve 35, is connected to a pipe 39, which leads to the brake cylinder 7.

In the release position of the slide valve 35, passage 38 is connected through cavity 40, with passage 41, which leads to the usual straight air pipe 42. Also, in release position, port 43 registers with a passage 44, leading to the pipe 45, through which the sanding reservoir 11 is charged with fluid under pressure.

The pilot valve device 12 may comprise a flexible diaphragm 46, subject to the opposing fluid pressures in diaphragm chambers 47 and 48, and to the pressure of a coil spring 49, contained in chamber 47, said diaphragm being adapted to operate a double beat valve 50, contained in a chamber 51. The double beat valve 50 is normally maintained seated against the seat 52 by a coil spring 53, contained in a chamber 54.

The control valve device 13 may comprise a casing having a piston chamber 55, containing a piston 56, and a valve chamber 57, containing a slide valve 58, adapted to be operated by said piston. The piston chamber 55 is connected to the chamber 51 of the pilot valve device 12, through pipe and passage 59. The valve chamber 57 is connected to the reservoir 15 by a passage and pipe 61.

Chamber 62 of the switch device 14 is connected by a pipe and passage 63 with the seat of the slide valve 58 of the control valve device 13. A ball check valve 64 is mounted in the pipe 63 to prevent back flow from the chamber 62 to the control valve device 13.

When the emergency valve device 9 is in the release position shown in the drawings, the slide valve 35 laps a port 65, which is connected to the sanding pipe 66. The sanding pipe 66 is connected to the pipe 63 between the check valve 64 and the chamber 62 of the switch device 14 by a pipe 67, containing a ball check valve 68, adapted to prevent brake flow from the chamber 62 to the sanding pipe 66. Between the check valve 68 and the pipe 63, the pipe 67 is provided with a restricted atmospheric vent port 69, the purpose of which will be hereinafter more fully described.

When the apparatus is in the release position, as shown in Fig. 1, the brake cylinder 7 and the chamber 48 of the pilot valve device 12 are vented to the atmosphere in the usual manner, through pipe 39, passage 38, valve cavity 40 of the emergency valve device 9, passage 41, straight air pipe 42, cavity 70 of the valve 30 of the brake valve device 8, and atmospheric exhaust port 71.

Chamber 55 of the control valve device 13 is charged with fluid under pressure from the main reservoir 10, through pipe 29, chamber 54 of the pilot valve device 12, past the fluted stem 72 of the double beat valve 50, chamber 51, and passage and pipe 59. With the chamber 55 thus charged with fluid under pressure, the piston 56 will be positioned at the right, and valve chamber 57 and the reservoir 15 will be charged with fluid under pressure through the feed groove 74 in the usual manner.

With the emergency valve 35 in the release position, the sanding reservoir 11 will be charged with fluid under pressure from the main reservoir 10, through pipe 29, passage 37, valve chamber 35, ports 75 and 43, passage 44, and pipe 45.

When it is desired to make a service application of the brakes, the brake valve is moved to its service position, thus connecting the main reservoir pipe 29 with the straight air pipe 42, (see Fig. 2). The brake cylinder 7 is now supplied with fluid under pressure through the pipe 39, and since the chamber 48 is also connected to the brake cylinder pipe 39, such chamber will also be supplied with fluid under pressure. However, if the pressure of the fluid in chamber 48 is not sufficient to move the diaphragm 46 against the pressure of the spring 49, the pilot valve device 12, and the parts controlled thereby will not be operated. But should the pressure of the fluid admitted to the chamber 48, during an application of the brakes, exceed the pressure of the pressure of the spring 49, then the diaphragm 46 will be flexed toward the right, and the pilot valve device 12 and associated parts will be operated in the manner hereinafter more fully described.

When it is desired to effect an emergency application of the brakes, the valve 30 is moved to its emergency position, thus connecting the pipe 36 with the atmospheric vent port 71, and the pipe 42 with the main reservoir pipe 29 (see Fig. 2).

Fluid is then vented from piston chamber 32, so that piston 33 is shifted to the right by the fluid pressure in valve chamber 34. The valve 35 is also shifted, so that cavity 76 connects passage 65 with passage 44. Fluid under pressure is then supplied from the sanding reservoir 11, to the sanding pipe 66, and also through the pipe 67, past the ball check valve 68, to piston chamber 62. Piston 22 is thereupon shifted downwardly so that the contact member 24 closes the circuit to the magnetic brake shoe 6, thereby energizing the coils of said shoe.

Fluid under pressure supplied from the sanding reservoir 11 gradually vents to the atmosphere through the restricted port 69, until the reservoir pressure has been reduced sufficiently to permit the piston 22 to be moved upwardly by the spring 27. The circuit of the magnetic brake shoe 6 is then opened. In this way the time in which the coils (not shown) of the magnetic brake shoe 6 are energized is limited in each brake application, so as to prevent the possible burning out of the coils, in case the brakes should be left applied for too long a period When the emergency valve 35 is shifted to the right, in the manner above described, passage 38, at the seat of the slide valve 35, will be uncovered, so that fluid under pressure is supplied to the brake cylinder 7 from the main reservoir 10, through pipe 39, as has been previously described.

When the brake cylinder pressure is increased above a predetermined amount so that the fluid under pressure in chamber 48 deflects the diaphragm 46 toward the right against the pressure of spring 49, the double beat valve 50 will also be shifted from the position shown in Fig. 1 toward the right, and chamber 51 will be connected with chamber 47, through passage 77.

Fluid is then vented from piston chamber 55 to the atmosphere, through passage and pipe 59, chamber 51, passage 77, chamber 47, and vent port 78. The piston 56 of the control valve device 13 is then shifted to the left by the fluid pressure in valve chamber 57. The valve 58 is also shifted, so that the passage 63 at the seat of the valve 58 is uncovered. Fluid under pressure is then supplied from the reservoir 15 to the piston chamber 62, through pipe 61, valve chamber 57, and passage and pipe 63, past the ball check valve 64. The piston 22 is thereupon operated in the manner heretofore described, so that the circuit of the magnetic brake shoe 6 is closed. It will also be understood that the pressure of the fluid in the reservoir 15 will gradually blow down through the atmospheric vent port 69, in the manner heretofore described, so that the circuit of the magnetic brake shoe 6 will be opened after a period of time.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a brake cylinder, and means for supplying fluid under pressure to the brake cylinder, of a magnetic brake device, a pilot valve device subject to brake cylinder pressure, and operative only when the brake cylinder pressure exceeds a predetermined amount, a pneumatically operated switch device for controlling the circuit of the magnetic brake, a reservoir, and a control valve device adapted to be operated when said pilot valve device is operated for supplying fluid pressure from said reservoir to said switch device.

In testimony whereof I have hereunto set my hand, this 20th day of March, 1930.

JOSEPH C. McCUNE.